Dec. 29, 1925.                      1,567,634
D. BLUMBERG
AUTOMOBILE BRAKE BAND ATTACHMENT
Filed Dec. 31, 1924
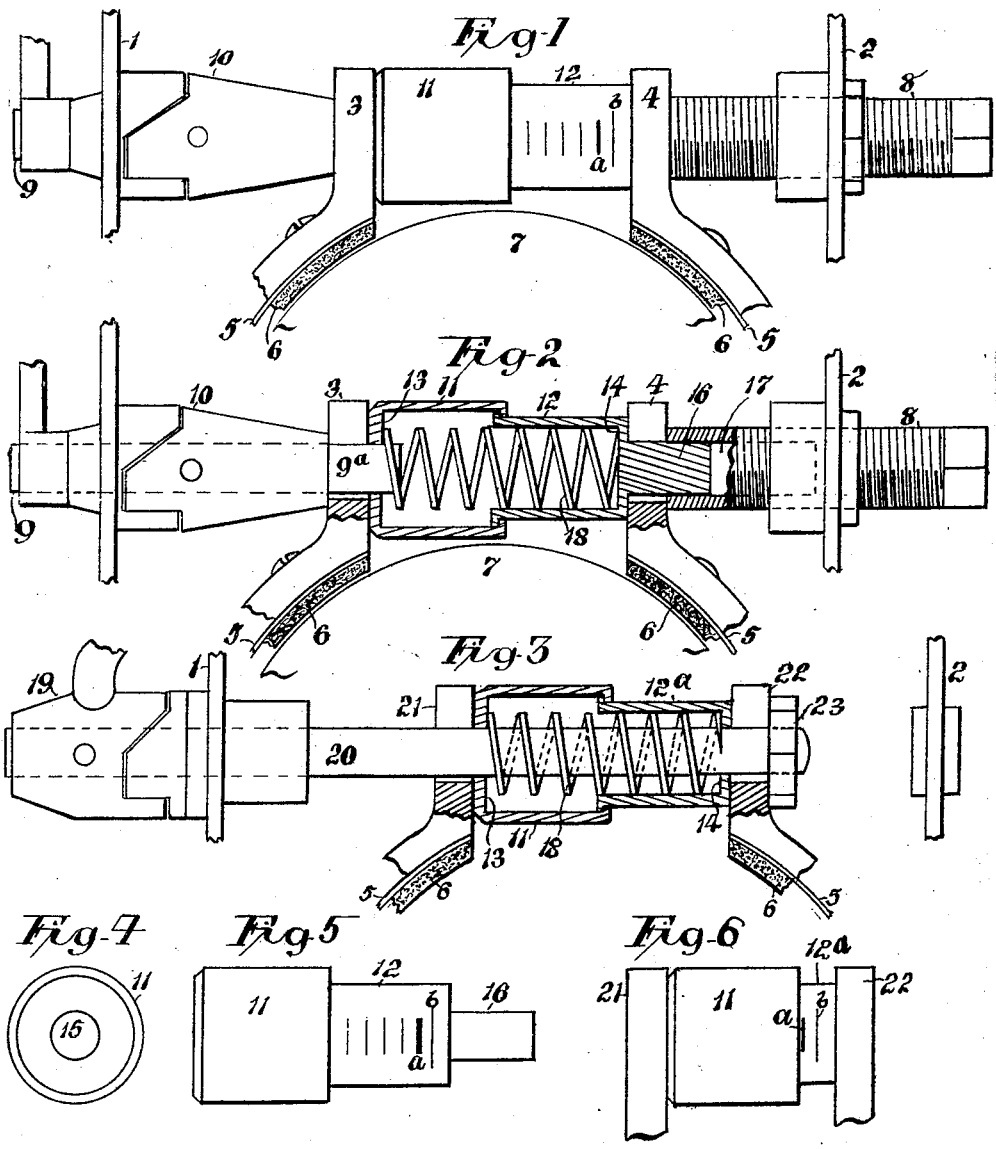
INVENTOR.
David Blumberg,
BY
Geo. D. Phillips ATTORNEY Patented Dec. 29, 1925.

1,567,634

UNITED STATES PATENT OFFICE.

DAVID BLUMBERG, OF BRIDGEPORT, CONNECTICUT.

AUTOMOBILE BRAKE-BAND ATTACHMENT.

Application filed December 31, 1924. Serial No. 759,090.

*To all whom it may concern:*

Be it known that I, DAVID BLUMBERG, citizen of the United States, residing at Bridgeport, in the county of Fairfield and State of Connecticut, have invented certain new and useful Improvements in Automobile Brake-Band Attachments; and I do hereby declare the following to be a full, clear, and exact description of the invention such as will enable others skilled in the art to which it appertains, to make and use the same.

This invention relates to improvements in brake band mechanism, and it consists of a telescopic device inserted and supported between the ears of brake bands, and is adapted to embrace all pedal shaft constructions, and is provided with means whereby the wearing condition of the brake band linings clearly indicated by a part exposed to view. The novelty of construction and advantage of the device will be fully understood from the following description and claims when taken in connection with the annexed drawings, in which—

Figure 1 represents a broken view of brake band mechanism showing the improved device connected with a broken slow speed pedal shaft.

Figure 2 is a similar view partly in section.

Figure 3 is a broken view partly in section of the brake band construction connected with an unbroken pedal shaft, and central section view of the improved device.

Figure 4 is a detail end elevation of the improved device.

Figure 5 is a detail side elevation of the device and

Figure 6 is a detail side elevation of the closed device and broken view of the ears of a brake band.

In automobiles equipped with what is known as a "slow speed shaft" the latter cannot be removed for the purpose of relining the brake band without first removing the upper portion of the transmission case. To obviate this, it is customary to remove a portion of the shaft and insert a detachable shaft extension.

Figures 1 and 2 represent the usual construction of the Ford slow speed mechanism comprising the broken sides 1, 2, of the transmission case, ears 3, 4, of the one piece brake band 5, lining 6, and drum 7. The usual adjusting screw 8 is threaded through the side 2 of the transmission case and abuts the ear 4. Opposite thereto is the pedal shaft 9 journaled in the side 1 of the transmission case, and 10 is the usual cam for rotating the shaft.

The pedal shaft 9 is shortened so that its end 9$^a$ projects freely through and a trifle inside the ear 3, and a cup shaped shell 1 having a hole 15 in its outer or closed end 13 is supported on said shaft by reason of the fact that the latter extends freely within said hole.

12 is a cup-shaped shell contained within the shell 11 in telescoping relation, and having extending from its outer wall 14 a stud 16 which projects freely through the ear 4 within an opening 17 at the inner end of the screw 8. 18 is a coil spring housed within these shells and bearing against the respective end walls of said shells to always keep the latter in contact with the respective ears 3 and 4, and to force the ears apart and thereby release the brake linings from the drum.

The shortening of the pedal shaft and the provision of the stud 16 extending from the female shell 12 into the screw 8, as above described and as is specifically identified with Figures 1, 2, 5, and 6, renders it unnecessary to extend the pedal shaft entirely through the shells into the opposing brake band ear, so as to afford proper supports for the shells, and greatly simplifies the removal of worn brake bands and the substitution of new ones.

But, if preferred, the pedal shaft may be extended in the manner above described, as is shown at Figure 3 in which the actuating cam 19 is located outside of the transmission case, and the pedal shaft 20 extends through both ears 21, 22, and also through the outer end walls of both telescoping shells, and is held in position by the nut 23.

Therefore, the mere manner in which the shells are supported is immaterial, the chief feature of the invention being in the telescopic shells with the spring housed therein and functioning as above described.

An essential feature of this telescopic device, inserted between the ears of brake bands, is the convenience of noting at any time the condition of the brake lining, so that the same can be renewed in time to avoid scoring of the surface of the drum by contact of the brake band therewith. For this purpose, a scale, such as shown on the smaller shell 12, could be employed, or any other distinguishing evidence that would show the wearing condition of the lining.

When the shells have been contracted so that the inner edge of the shell 11 registers with the mark designated by *a* on the shell 12, at Figure 6, this will indicate that relining is necessary, and that further contraction to the mark *b*, for instance, would bring the brake band against the drum.

Having thus described my invention, what I claim is:—

1. In combination with a brake band having opposed ears and a pedal shaft projecting through one of said ears, an adjusting screw in alignment with said shaft having an opening in its inner end, telescopic cup shells interposed between the ears, one of said shells freely engaging the inner end of the shaft, the other shell having a pintle projecting through the opposed ear and into the opening of the adjusting screw, and a spring located within the shells and abutting their end walls and functioning to always keep said walls in contact with said ears and to normally release the brake band.

2. In combination with the brake band having opposed ears and a pedal shaft operatively connected to contract said ears and apply the brake, of a pair of telescoping shells supported between said ears, and a coil spring housed within said shells and functioning to always keep said ears and shells in contact and to normally release the brake band.

In testimony whereof I affix my signature.

DAVID BLUMBERG.